(12) United States Patent
Barsony et al.

(10) Patent No.: US 9,703,863 B2
(45) Date of Patent: *Jul. 11, 2017

(54) DOCUMENT CLASSIFICATION AND CHARACTERIZATION

(71) Applicant: DiscoverReady LLC, New York, NY (US)

(72) Inventors: Stephen John Barsony, King of Prussia, PA (US); Yerachmiel Tzvi Messing, Baltimore, MD (US); David Matthew Shub, Cranford, NJ (US); James Kenneth Wagner, Jr., Atlanta, GA (US)

(73) Assignee: DiscoverReady LLC, New York, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/794,446

(22) Filed: Mar. 11, 2013

(65) Prior Publication Data

US 2013/0246426 A1 Sep. 19, 2013

Related U.S. Application Data

(63) Continuation of application No. 13/014,643, filed on Jan. 26, 2011, now Pat. No. 8,396,871.

(51) Int. Cl.
*G06F 17/30* (2006.01)
*G06Q 10/00* (2012.01)

(52) U.S. Cl.
CPC .... *G06F 17/30713* (2013.01); *G06F 17/3071* (2013.01); *G06Q 10/00* (2013.01)

(58) Field of Classification Search
CPC .......... G06F 17/3071; G06F 17/30707; G06F 17/30873; G06F 17/30864
USPC ..... 707/737, 738, 739, 740, 752, 754; 704/9
See application file for complete search history.

(56) References Cited

U.S. PATENT DOCUMENTS

| | | |
|---|---|---|
| 5,832,470 A | 11/1998 | Morita et al. |
| 6,356,899 B1 | 3/2002 | Chakrabarti et al. |
| 6,389,413 B2 | 5/2002 | Takahashi et al. |
| 6,687,696 B2 | 2/2004 | Hofmann et al. |
| 6,694,331 B2 | 2/2004 | Lee |

(Continued)

FOREIGN PATENT DOCUMENTS

| | | |
|---|---|---|
| EP | 1588535 A1 | 10/2005 |
| EP | 2113850 A2 | 11/2009 |

(Continued)

*Primary Examiner* — Monica Pyo
(74) *Attorney, Agent, or Firm* — Mintz Levin Cohn Ferris Glovsky and Popeo, P.C.

(57) ABSTRACT

Data is received that characterizes each of a plurality of documents within a document set. Based on this data, the plurality of documents are grouped into a plurality of stacks using one or more grouping algorithms. A prime document is identified for each stack that includes attributes representative of the entire stack. Subsequently, provision of data is provided that characterizes documents for each stack including at least the identified prime document to at least one human reviewer. User-generated input from the human reviewer is later received that categorized each provided document and data characterizing the user-generated input can then be provided. Related apparatus, systems, techniques and articles are also described.

21 Claims, 5 Drawing Sheets

(56) References Cited

U.S. PATENT DOCUMENTS

| | | |
|---|---|---|
| 6,738,760 B1 * | 5/2004 | Krachman ............ G06Q 50/16 |
| 6,778,977 B1 | 8/2004 | Avadhanam et al. |
| 7,328,216 B2 | 2/2008 | Hofmann et al. |
| 7,366,714 B2 | 4/2008 | Krachman |
| 7,475,107 B2 | 1/2009 | Maconi et al. |
| 7,480,251 B2 | 1/2009 | Foschiano et al. |
| 7,519,589 B2 | 4/2009 | Charnock et al. |
| 7,519,673 B2 | 4/2009 | Zakarian et al. |
| 7,556,806 B2 | 7/2009 | Wang |
| 7,574,433 B2 | 8/2009 | Engel |
| 7,593,995 B1 | 9/2009 | He et al. |
| 7,617,195 B2 | 11/2009 | Liang et al. |
| 7,640,323 B2 | 12/2009 | Sun |
| 7,644,138 B2 | 1/2010 | Sun |
| 7,657,522 B1 | 2/2010 | Puzicha et al. |
| 7,657,603 B1 | 2/2010 | He et al. |
| 7,671,187 B2 | 3/2010 | Aguirre et al. |
| 7,680,773 B1 | 3/2010 | Acharya et al. |
| 7,692,807 B1 | 4/2010 | Sanders et al. |
| 7,716,196 B2 | 5/2010 | Ghielmetti et al. |
| 7,730,113 B1 | 6/2010 | Payette et al. |
| 7,743,051 B1 | 6/2010 | Kashyap et al. |
| 7,747,455 B2 | 6/2010 | Barr et al. |
| 7,747,631 B1 | 6/2010 | Puzicha et al. |
| 7,761,427 B2 | 7/2010 | Martin et al. |
| 7,779,152 B2 | 8/2010 | Narayanan |
| 7,791,355 B1 | 9/2010 | Esher et al. |
| 7,792,945 B2 | 9/2010 | Paknad et al. |
| 7,801,761 B2 | 9/2010 | Varadarajan et al. |
| 7,890,440 B1 | 2/2011 | Hardy |
| 7,933,859 B1 | 4/2011 | Puzicha et al. |
| 8,296,309 B2 | 10/2012 | Brassil et al. |
| 8,396,871 B2 | 3/2013 | Barsony et al. |
| 8,706,742 B1 | 4/2014 | Ravid et al. |
| 8,769,708 B2 | 7/2014 | Messing et al. |
| 8,818,996 B2 | 8/2014 | Barney |
| 2003/0105765 A1 | 6/2003 | Smith et al. |
| 2004/0243391 A1 | 12/2004 | Nelson et al. |
| 2006/0053104 A1 * | 3/2006 | Ferrari .................. G06F 3/0482 |
| 2006/0085216 A1 | 4/2006 | Guerrero |
| 2007/0244915 A1 | 10/2007 | Cha et al. |
| 2008/0033904 A1 | 2/2008 | Ghielmetti et al. |
| 2008/0038286 A1 | 2/2008 | Geng et al. |
| 2008/0065811 A1 | 3/2008 | Jahangiri |
| 2008/0081781 A1 | 4/2008 | Lippa et al. |
| 2008/0082929 A1 | 4/2008 | Stignani et al. |
| 2008/0108713 A1 | 5/2008 | Begovich et al. |
| 2008/0219557 A1 | 9/2008 | Dawson et al. |
| 2008/0229037 A1 | 9/2008 | Bunte et al. |
| 2008/0244034 A1 | 10/2008 | Shannon et al. |
| 2008/0282355 A1 | 11/2008 | Nemazi et al. |
| 2008/0319984 A1 | 12/2008 | Proscia et al. |
| 2009/0030754 A1 | 1/2009 | McNamar |
| 2009/0055503 A1 | 2/2009 | Crivella et al. |
| 2009/0076142 A1 | 3/2009 | Han et al. |
| 2009/0077136 A1 | 3/2009 | Igawa et al. |
| 2009/0089539 A1 | 4/2009 | Bunker et al. |
| 2009/0097662 A1 | 4/2009 | Olechowski et al. |
| 2009/0106239 A1 | 4/2009 | Getner et al. |
| 2009/0106276 A1 | 4/2009 | Bouchard |
| 2009/0111976 A1 | 4/2009 | Aguirre et al. |
| 2009/0125506 A1 | 5/2009 | Kim |
| 2009/0150168 A1 | 6/2009 | Schmidt |
| 2009/0150431 A1 | 6/2009 | Schmidt et al. |
| 2009/0150866 A1 | 6/2009 | Schmidt |
| 2009/0150906 A1 | 6/2009 | Schmidt et al. |
| 2009/0164435 A1 | 6/2009 | Routt |
| 2009/0164522 A1 | 6/2009 | Fahey |
| 2009/0164588 A1 | 6/2009 | D'Amato et al. |
| 2009/0164790 A1 | 6/2009 | Pogodin |
| 2009/0165026 A1 | 6/2009 | Paknad et al. |
| 2009/0187797 A1 | 7/2009 | Raynaud-Richard et al. |
| 2009/0192944 A1 | 7/2009 | Sidman et al. |
| 2009/0198651 A1 | 8/2009 | Shiffer et al. |
| 2009/0198670 A1 | 8/2009 | Shiffer et al. |
| 2009/0198674 A1 | 8/2009 | Custis et al. |
| 2009/0198677 A1 | 8/2009 | Sheehy et al. |
| 2009/0198689 A1 | 8/2009 | Frazier et al. |
| 2009/0199274 A1 | 8/2009 | Frazier et al. |
| 2009/0216696 A1 | 8/2009 | Downs et al. |
| 2009/0233850 A1 | 9/2009 | McFadden et al. |
| 2009/0254572 A1 | 10/2009 | Redlich et al. |
| 2009/0262682 A1 | 10/2009 | Khetawat et al. |
| 2009/0262683 A1 | 10/2009 | Khetawat et al. |
| 2009/0262684 A1 | 10/2009 | Khetawat et al. |
| 2009/0262702 A1 | 10/2009 | Khetawat et al. |
| 2009/0262703 A1 | 10/2009 | Khetawat et al. |
| 2009/0262704 A1 | 10/2009 | Khetawat et al. |
| 2009/0264095 A1 | 10/2009 | Khetawat et al. |
| 2009/0264126 A1 | 10/2009 | Khetawat et al. |
| 2009/0265199 A1 | 10/2009 | Moerdler et al. |
| 2009/0265542 A1 | 10/2009 | Khetawat et al. |
| 2009/0265543 A1 | 10/2009 | Khetawat et al. |
| 2009/0265609 A1 * | 10/2009 | Rangan et al. ................ 715/234 |
| 2009/0270423 A1 | 10/2009 | Blackwell et al. |
| 2009/0276413 A1 | 11/2009 | Uchida |
| 2009/0276467 A1 | 11/2009 | Scholtes et al. |
| 2009/0287685 A1 | 11/2009 | Charnock et al. |
| 2009/0319312 A1 | 12/2009 | Moerdler et al. |
| 2009/0319506 A1 | 12/2009 | Ngan |
| 2009/0326969 A1 | 12/2009 | Paknad et al. |
| 2009/0327048 A1 | 12/2009 | Kisin et al. |
| 2009/0327049 A1 | 12/2009 | Kisin et al. |
| 2009/0327375 A1 | 12/2009 | Paknad et al. |
| 2010/0017239 A1 | 1/2010 | Saltzman et al. |
| 2010/0023353 A1 | 1/2010 | Stoffiere |
| 2010/0030798 A1 | 2/2010 | Kumar et al. |
| 2010/0046792 A1 | 2/2010 | Anderson et al. |
| 2010/0046827 A1 | 2/2010 | Anderson et al. |
| 2010/0070265 A1 | 3/2010 | Nelson et al. |
| 2010/0077301 A1 | 3/2010 | Bodnick et al. |
| 2010/0082382 A1 | 4/2010 | Kisin et al. |
| 2010/0082548 A1 | 4/2010 | Crockett et al. |
| 2010/0082555 A1 | 4/2010 | Ogawa et al. |
| 2010/0082676 A1 | 4/2010 | Paknad et al. |
| 2010/0097662 A1 | 4/2010 | Churilla et al. |
| 2010/0106685 A1 | 4/2010 | Ott et al. |
| 2010/0107156 A1 | 4/2010 | Andersen et al. |
| 2010/0114832 A1 | 5/2010 | Lillibridge et al. |
| 2010/0125664 A1 | 5/2010 | Hadar et al. |
| 2010/0131470 A1 | 5/2010 | Schmidt |
| 2010/0138500 A1 | 6/2010 | Consul et al. |
| 2010/0138653 A1 | 6/2010 | Spencer et al. |
| 2010/0145932 A1 | 6/2010 | Rook et al. |
| 2010/0146056 A1 | 6/2010 | Consul et al. |
| 2010/0146299 A1 | 6/2010 | Swaminathan et al. |
| 2010/0161313 A1 | 6/2010 | Karttunen |
| 2010/0161314 A1 | 6/2010 | Karttunen et al. |
| 2010/0161639 A1 | 6/2010 | Bobrow et al. |
| 2010/0185875 A1 | 7/2010 | Mayer et al. |
| 2010/0198986 A1 | 8/2010 | Andersen et al. |
| 2010/0205020 A1 | 8/2010 | Losey |
| 2010/0306204 A1 | 12/2010 | Chitiveli et al. |
| 2010/0306206 A1 | 12/2010 | Brassil et al. |
| 2011/0270826 A1 | 11/2011 | Cha et al. |
| 2012/0191708 A1 | 7/2012 | Barsony et al. |
| 2012/0192286 A1 | 7/2012 | Messing et al. |
| 2012/0330946 A1 | 12/2012 | Arredondo et al. |
| 2013/0246430 A1 | 9/2013 | Szucs et al. |
| 2014/0019371 A1 | 1/2014 | Albertelli |
| 2014/0067829 A1 | 3/2014 | Barney |

FOREIGN PATENT DOCUMENTS

| | | |
|---|---|---|
| EP | 2214109 A1 | 8/2010 |
| WO | WO-2008020860 A2 | 2/2008 |
| WO | WO-2008022187 A1 | 2/2008 |
| WO | WO-2008027477 A2 | 3/2008 |
| WO | WO-2008070415 A2 | 6/2008 |
| WO | WO-2008070688 A1 | 6/2008 |
| WO | WO-2008083211 A1 | 7/2008 |
| WO | WO-2008127257 A2 | 10/2008 |
| WO | WO-2009052265 A1 | 4/2009 |
| WO | WO-2009085239 A2 | 7/2009 |

(56) References Cited

FOREIGN PATENT DOCUMENTS

| | | |
|---|---|---|
| WO | WO-2009094521 A1 | 7/2009 |
| WO | WO-2009102765 A2 | 8/2009 |
| WO | WO-2009129516 A1 | 10/2009 |
| WO | WO-2010022343 A2 | 2/2010 |
| WO | WO-2010022346 A2 | 2/2010 |
| WO | WO-2010051260 A1 | 5/2010 |
| WO | WO-2010065458 A2 | 6/2010 |

* cited by examiner

DOCUMENT CLASSIFICATION AND CHARACTERIZATION

CROSS REFERENCE

This is a continuation of patent application Ser. No. 13/014,643 filed Jan. 26, 2011, now U.S. Pat. No. 8,396,871 issued Mar. 12, 2013 entitled DOCUMENT CLASSIFICATION AND CHARACTERIZATION, the disclosure of which is incorporated herein by reference.

TECHNICAL FIELD

The subject matter described herein relates to systems, methods, and articles for document classification and characterization for use in applications such as litigation-oriented pre-trial discovery.

BACKGROUND

Technology has exponentially facilitated the capacity to generate, share and store information, acting as the backbone of our knowledge-based economy. But that same technological capacity that supports our economy is negatively impacting our justice system. It has created enormous problems for trial lawyers and their clients, who are regularly challenged to sift through terabytes of information to find relevant, privileged or confidential material in a way that is accurate, consistent and yet cost-effective.

When one case can require sorting through a terabyte of data, the result can be 75 million pages for review, taking up to 375,000 hours of time. Studies have estimated that document review accounts for 50 to 90 percent of the cost involved in litigation matters, and one report has suggested that 70 percent or more of the cost of discovery is now attributable solely to human review of documents for responsiveness and privilege.

The problem with purely human review of documents is not just a problem of time and money. It is one of consistency and accuracy as well. Dozens of reviewers working on thousands of documents a day are bound to sort and code documents differently based on their subjective judgments, experience levels, fatigue and other factors. Even with sound quality control checks, the risks of making a mistake are substantial, and the results can be devastating: discovery sanctions, loss of trade secrets, loss of attorney-client privilege, or a bad outcome at trial. The mounting costs and exposures associated with human document review can affect even the calculus of whether to sue, defend or settle for any given claim.

SUMMARY

Systems, methods, and articles are provided herein to focus and expedite human review of documents in connection with litigation oriented document review. In particular, the current subject matter enables simultaneous grouping of electronic files based on multiple characteristics, including: relevance to a particular discovery request, potential privilege, confidentiality, and case-specific issues. Virtual "stacks" of electronic files or documents that are substantially similar in content are created. Thereafter, the documents in each stack are scored for relative similarity as compared to a prime/representative document, facilitating targeted quality control review and subsequent analysis.

While not all documents are typically sufficiently similar to be placed into a multi-member Stack, stacks can compose as much as 50 to 80 percent of any given case. The current subject matter can, for example, quickly eliminate half or more of the time associated with human review, and this time savings can be greatly leveraged by using the process to group and/or classify electronic discovery files for multiple issues (some of which can include multiple grades) simultaneously—such as responsiveness, privilege, and confidentiality.

In one aspect, data is received that characterizes each of a plurality of documents within a document set. Based on this data, the plurality of documents are grouped into a plurality of stacks using one or more grouping algorithms. A prime document is identified for each stack that includes attributes representative of the entire stack. Subsequently, provision of data is provided that characterizes documents for each stack including at least the identified prime document to at least one human reviewer. User-generated input from the human reviewer is later received that categorized each provided document and data characterizing the user-generated input can then be provided.

Categorization of each provided document based on the user-generated input can be propagated to all documents within the corresponding stack. The human reviewer can categorize each provided document in a group of document review categories. The document review categories can be selected from a group comprising: relevance, responsiveness, and privilege.

Data characterizing supplemental documents within a stack other than the provided documents can be supplemented to at least one human reviewer for quality control. Supplemental documents whose data is sent to at least one human reviewer can be selected for quality control based on an algorithm designed to select documents based on their likelihood to require remediation. Tiers of documents can be defined within each stack. In such cases, the supplemental documents can comprise documents from two or more tiers. The tiers can be based on or more of: document similarity relative to the corresponding prime document, document type, document author, and the like.

Documents can be incrementally added to the document set after the grouping of the plurality of documents into the plurality of stacks. In such cases, the incrementally added documents can be associated to one of the plurality of stacks. For each stack, if the stack has already been categorized, the corresponding incrementally added documents are added to the stack and propagating the categorization to the incrementally added documents in such stack. Alternatively, if the stack has not been categorized, the incrementally added documents can be added to the stack. In some situations, at least one documents is incrementally added to the document set after the grouping of the plurality of documents into the plurality of stacks and it is determined that the at least one incrementally added document is not associated with a previously defined stack which results in a new stack being defined.

Hierarchical relationships can be defined among the plurality of documents within the set of documents. When such relationships exist, the grouping algorithms can take into account the relationships between documents when grouping the plurality of documents into the plurality of stacks.

In some implementations, the documents in the stacks are disjoint (i.e., each document only belongs to one stack). In other cases, a document can be part of two or more stacks.

Providing the data can comprise one or more of: displaying the data, transmitting the data to a remote computing system, and persisting the data. The data characterizing documents for each stack provided to the at least one human reviewer can comprise reference numbers (or other identifiers) for such documents or they can comprise the documents themselves or electronic representations of same.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. Method operations can be implemented by one or more data processors forming part of a single computing system or distributed among two or more computing systems.

The subject matter described herein provides many advantages. For example, the systems and techniques described herein provide an enhanced electronic solution to document review that can provide optimal speed, accuracy, and consistency while at the same time being defensible in court.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter provides systems, apparatuses, methods, and articles relating to litigation document review and organization. In some implementations, similar documents can be grouped into stacks that are comprised entirely of documents sufficiently similar to be coded identically for litigation discovery purposes with a high degree of accuracy (referred herein as "stacks"). Additional operations can include human review of stack representatives (i.e., documents that were identified as being representative of the stack as a whole), statistical analysis of stack composition, human review of a subset of the document population of a stack, statistical analysis of the results of the human subset review, targeted human review of documents identified by search as potentially privileged or related to specific issues, and final human review of a quality assurance sample or samples.

As used herein, the term document can refer to both physical evidence including paper documents as well as electronic files such as word processing files, e-mails, video files, and the like. In addition, a document need not necessarily correspond to an electronic file. A document can be stored in a portion of a file that holds other documents, in a single file dedicated to the document in question, or in a set of coordinated files. The documents may be text documents and/or other types of electronic documents including audio, video, picture ADOBE FLASH media files, and other forms of media. For example, a video file may have an associated description (e.g., the description may form part of the metadata/attributes of the video file, etc.) that may be considered herein to be a document. In some cases, certain types of documents such as documents containing no text or text below a pre-defined threshold can be excluded from the stacks and subject to different review standards (e.g., full review by humans, etc.). In addition, while the current disclosure is predominantly directed to the review and organization of documents in connection with litigation, it will be appreciated that the current subject matter can be applied to any situation in which there are large amounts of documents which need to be categorized, at least in part, by a human reviewer. For example, the current subject matter can be utilized in connection with governmental or regulatory investigation as well as company internal investigations. The current subject matter can also be used in academia and/or research and development where there are requirements to classify documents for a wide variety of purposes including record retention.

Figure 1:
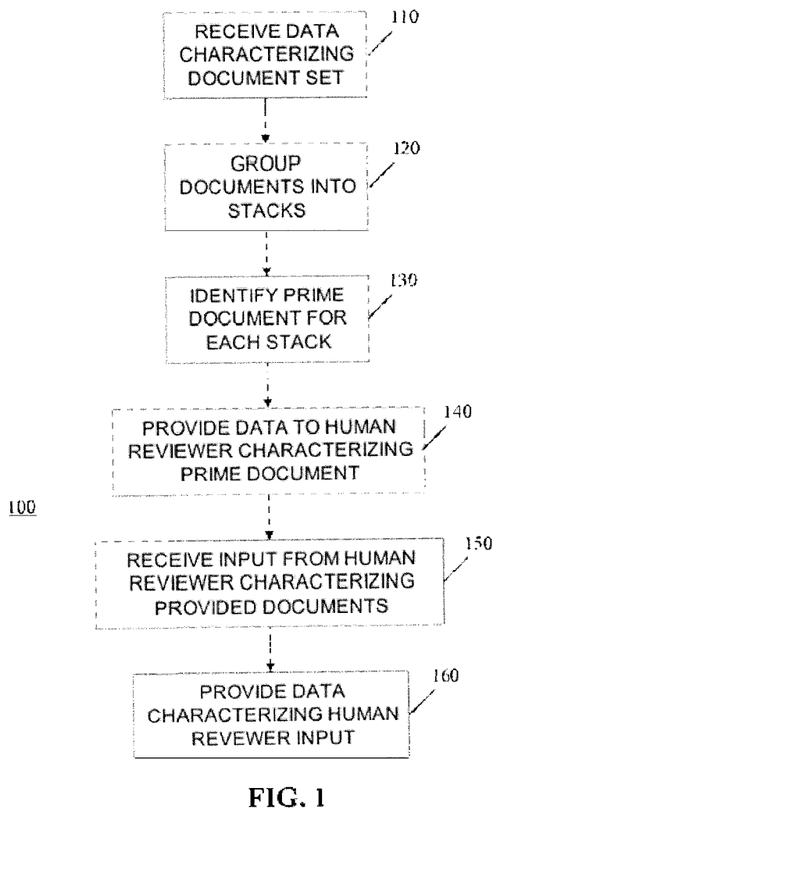
FIG. 1 is a process flow diagram illustrating a method for document discovery and classification.

FIG. 1 is a process flow diagram illustrating a method 110, in which, at 110, data characterizing each of a plurality of documents within a document set is received. Thereafter, at 120, the plurality of documents are grouped into a plurality of pairwise stacks using one or more grouping algorithms. From each stack, at 130, at least one prime document is identified. The prime document includes attributes representative of all of the documents in the corresponding stack. Provision of data characterizing documents of each stack including the prime document (e.g., documents identifiers, the documents themselves, etc.) is then, at 140, provided to at least one human reviewer. Subsequently, at 150, user-generated input is received from the human reviewer categorizing each provided document (and/or stacks of documents). Data can then, at 160, be provided (e.g., transmitted, displayed, persisted, etc.) characterizing such human input.

The human reviewer can evaluate the prime document according to defined sets of rules (guidelines) relating to characterization and categorization (relevance, responsiveness, privilege, issues, etc.). The decisions about the prime document can be input to a computer software application and stored in a computer database application. In some cases, when the prime document is provided to a user via graphical user interface, one or more graphical user interface elements can be included to facilitate the characterization and/or categorization of such documents (e.g., buttons identifying a document as being non-responsive or privileged, etc.). The decisions made by the human review can then be copied (propagated) to all members of the stack, including any duplicate documents, and these propagated decisions can be stored in a database. If a decision on an individual document is changed at any later point in time (such as through a quality control remediation step), that revised decision would only be copied (propagated) to all the other documents that are exact duplicates of the modified document.

In some implementations, key words (or other search criteria) can be identified in each document and weights can be assigned to each key word. Based on the identified keywords and their corresponding weights, a score can be provided for each document (using for example, a scorecard scoring model, etc.). These scores can be used as an input to the grouping algorithms used to establish the stacks and/or to aid in review prioritization (i.e., the order in which documents are presented to a human reviewer, etc). Additionally, the scores can be an indicator that can help facilitate decision propagation by identifying conditions with a greater error likelihood or increased probability of accuracy The grouping algorithm can use the similarity input variables separately as mentioned above, or in combination with other information for grouping documents (e.g., document metadata, location, date, etc.) for the best probability for accurate propagation and categorization. The characteristics for categorization can include relevance, responsiveness, privilege, issues, or feedback. The propagation and prediction results success can be measured by a sampling and testing protocol where targeted observations are made to determine the effectiveness of the stacking logic in relation to decision propagation The errors identified in this process can be evaluated using a combination of analytic methods including Z-test and multiple regression, and the results of the analysis determine the relative contribution of each of the variables to the error rate in each categorization.

The grouping algorithm can then be adjusted to off-set contribution of specific input variables (such as a document's stack membership, its length, its type, or its similarity rank to the prime) to the error rate and to better organize documents for future computer decisions and propagation. Different compensation schemes can be made available for each independent factor and for each categorization characteristic to increase the propagation accuracy. The grouping algorithm does not require the entire set (collection) to be processed at one time, and can be repeatedly adjusted as additional incremental documents are added to a set. Implementation of these adjustments can be simplified into thresholds on the input variables, where documents within a threshold or within a range defined by two or more thresholds are processed in a different manner than documents outside that threshold.

Figure 2A:
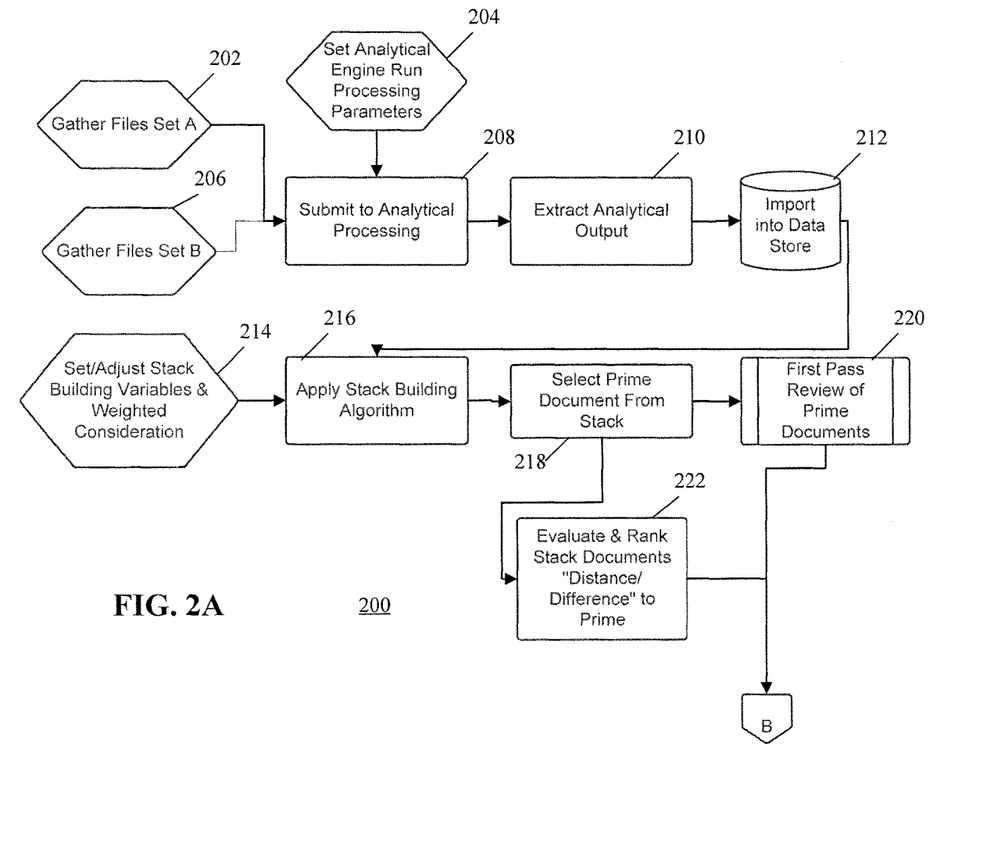
FIGS. 2A-2B illustrate a process flow diagram for adjusting stack building criteria.

FIGS. 2A and 2B are of a process flow diagram 200 illustrating a process for adjusting stack building criteria. As illustrated files sets A and B can be respectively gathered at 202 and 204, and submitted at 208 to analytical processing. The analytical processing at 208 uses predefined analytical engine processing parameters at 206 in order to result in an analytical output at 210 which characterizes the documents in the respective file sets A, B. This analytical output at 210 is then imported into a database/data store at 212 which is used at 216, by one or more stack building algorithms. These stack building algorithms define how document are to be grouped based on, for example, stack building variables and weights defined at 214. Prime documents at 218, are selected from each stack so that a first pass review of each prime document can be undertaken by a human reviewer at 220. In addition, the stacks can be evaluated so that the stack documents are ranked according to distance/difference from the prime at 222. This ranking can be helpful, for example, for quality control purposes and to prioritize human review of documents in the stack (if desired).

Figure 2B:
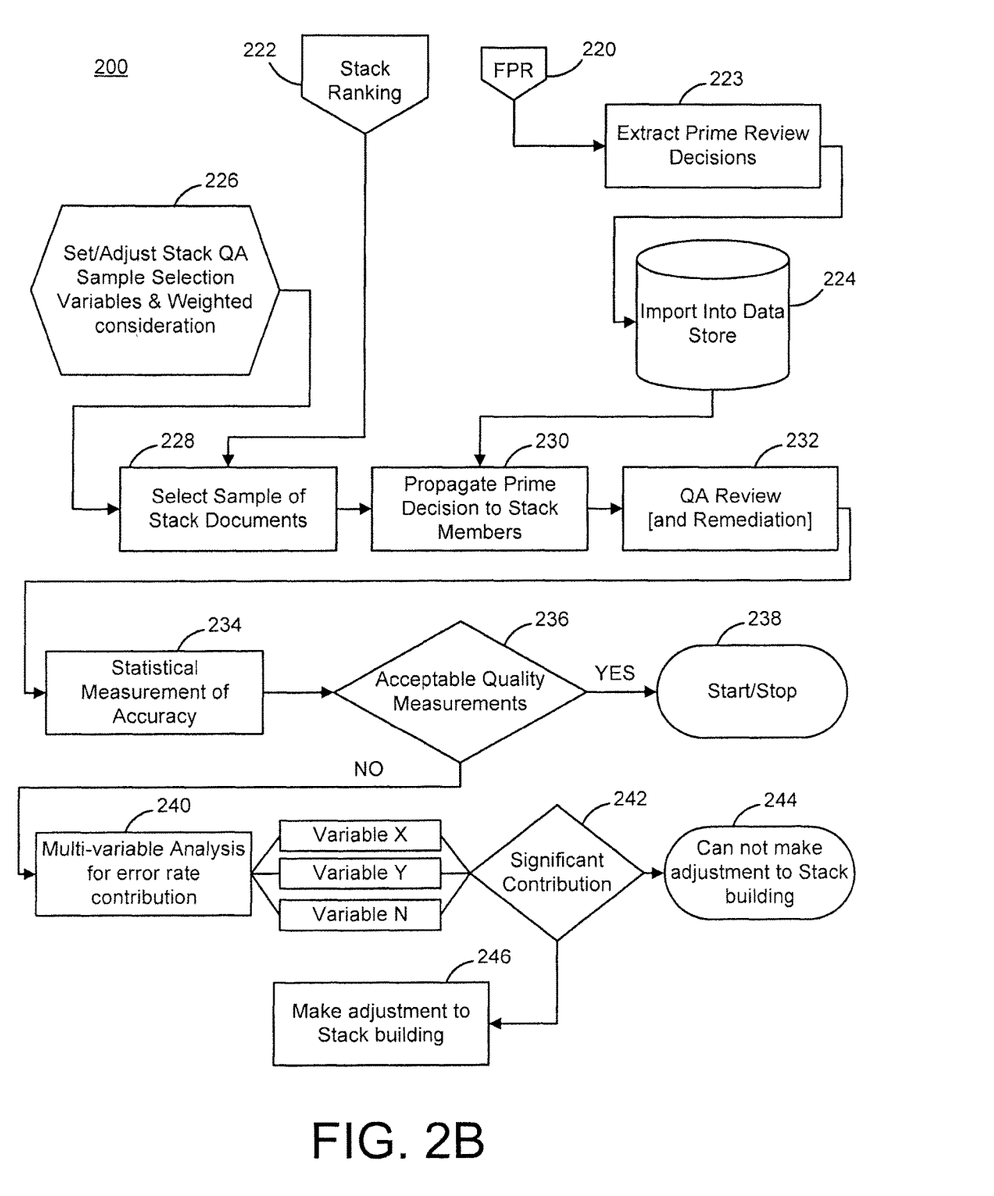

With reference to FIG. 2B, from the stack ranking (222), a sample of stack documents are selected using stack quality assurance sample and selection variables at 228 and weights at 226 (which can be adjusted as desired). In addition, prime review decisions are extracted at 223 from the documents that have been subjected to first pass review (FPR) at 220 and imported into one or more data stores (and optionally harmonized to fit a pre-defined format) at 224. Thereafter, at 230, prime decisions from the FPR are propagated to members of the stack. A subset of the stack documents can be selected for quality assurance review and remediation at 232. The subset may be randomly selected, or it may be selected in a partially targeted and partially randomized way, or it may be selected in an entirely targeted way. Targeting can be based on one or more variable such as words in text, document metadata, document type, randomized selection within ranges of similarity, or based on any other useful methodology. As used herein, the term "randomized" refers to the selection of documents/samples from within pre-defined boundaries which define the pool of documents/samples that form the basis for the randomized selection. For example, as stated above with regard to QC, tiers of documents can be defined within the stacks. These tiers can be based on a variety of criteria such as similarity to the corresponding prime document, document type, document author, and responsiveness to search terms. These documents can be subject to further quality assurance review and remediation at 232. Such further review can form the basis of further statistical measurements of accuracy at 234. It can then be determined whether the quality measurements exhibited acceptable results at 236. If so, then the process can be stopped at 238. If the quality measurements are not acceptable, then multi-variable analysis is performed in order to identify factors contributing to error rates at 240. It is then determined which variables significantly affect the error rate at 242 and in some cases adjustment can be made to how the stacks are built in order to lower the error rate at 246. In other cases it is determined that no further stack adjustments can be made at 244.

There are many variables which can contribute to error rates when building stacks. For example, stack document text resemblance/differences to the stack prime document, content and language or subject matter (e.g., patent infringement/contract, etc.), advanced textual concept, cluster or other analysis similarity/differences to the stack prime document; type of decision or conditions of a guideline rules (e.g., privileged/non-privileged as compared to relevant/not relevant, etc.); document types (e.g., presentations/spreadsheets/text messages, etc.); document length (e.g., number of words, file size, etc.); document author/custodian; rate of prime review and size/count/other (e.g., demographics, etc.) of input review set.

To determine the accuracy of the computer decisions made for the stack documents, statistical analyses such as confidence level testing (e.g., a Z-test, etc.) can be performed. Documents can be selected from a set of documents that have completed the full process including a propagation process and have final decisions using a variety of techniques such as weighted randomized selection from a group or groups of documents, where each group is determined by its member documents having a certain commonality, such as a similarity value within a range of similarity values or being responsive to certain word searches, or being of a particular document type or types, and where the weighting can be determined by variables such as the relative quantity of documents falling into each range or an expectation of the relative likelihood of documents in each group to benefit from remediation. From among the documents which meet the selection criteria being used, a sample document set can be selected in a randomized manner. The sample set can then presented to a human decision maker via a graphical user interface and the propagated decisions can be evaluated and confirmed or changed. The human decision maker may consult the prime document that is associated with any sample document being reviewed and may indicate that the prime document requires further investigation. At completion of the sample review, various analyses, such as overall or range-based confidence level analysis of accuracy, precision, recall, and F-score can be performed to measure accuracy range and confidence, to determine which factors/ variables contribute most to the error rate, and the like. These analyses support a quality improvement process, such as remediation (re-review), and adjusting the grouping algorithm. Additionally, at various points, random samples taken from the full population of all documents in a collection can be selected and analyzed. These extra fully-random samples can provide a measure of overall accuracy where the other samples are designed to measure only the computer decision accuracy.

Figure 3:
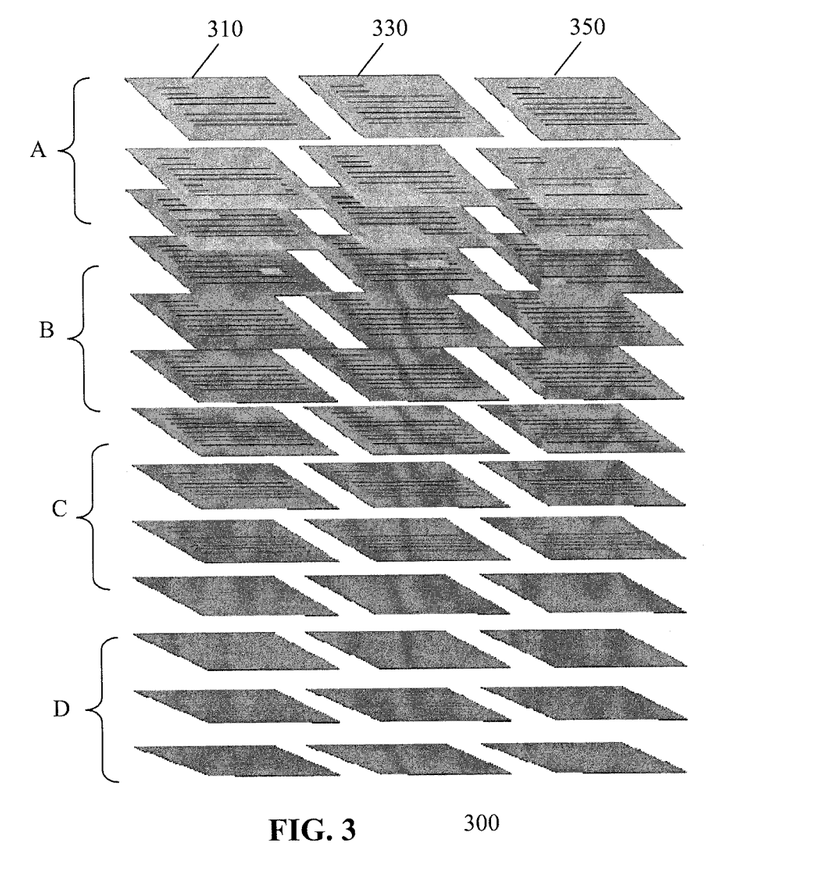
FIG. 3 is a diagram illustrating a plurality of tiered stacks.

FIG. 3 is a diagram 300 illustrating a plurality of stacks 310, 330, 350, each of which contains a plurality of documents. Each of the stacks can be segmented into a plurality of tiers A-D. These tiers can be defined based on factors such as rankings based on similarity (as defined by a similarity algorithm) to the prime document. For example, a first tier may A can comprise a top quartile of documents (based on similarity) and a fourth tier D can the bottom quartile of similar documents (based on similarity) and so on. Other criteria can be used to segment the stacks into the various tiers A-D including but not limited to: user-defined groupings, user-defined similarity metrics, document types, whether such documents are privileged, and the like. The user can then define a number of random samples to pull from each of the tiers A-D for quality assurance purposes. For example, a user can define different sample percentages for each of the tiers such as two percent of the first tier A, four percent of the second tier B, six percent of the third tier C, and ten percent of the fourth tier D. These sampling percentages can be particular to a single stack or applicable to a plurality of stacks. Based on these associated percentages, documents can be randomly selected within each respective tier A-D. These randomly selected documents are then reviewed by a human reviewer to assess whether the propagation of the prime document's characterization to the randomly selected document is appropriate. Any changes can be propagated to the stack as described above.

Figure 4:
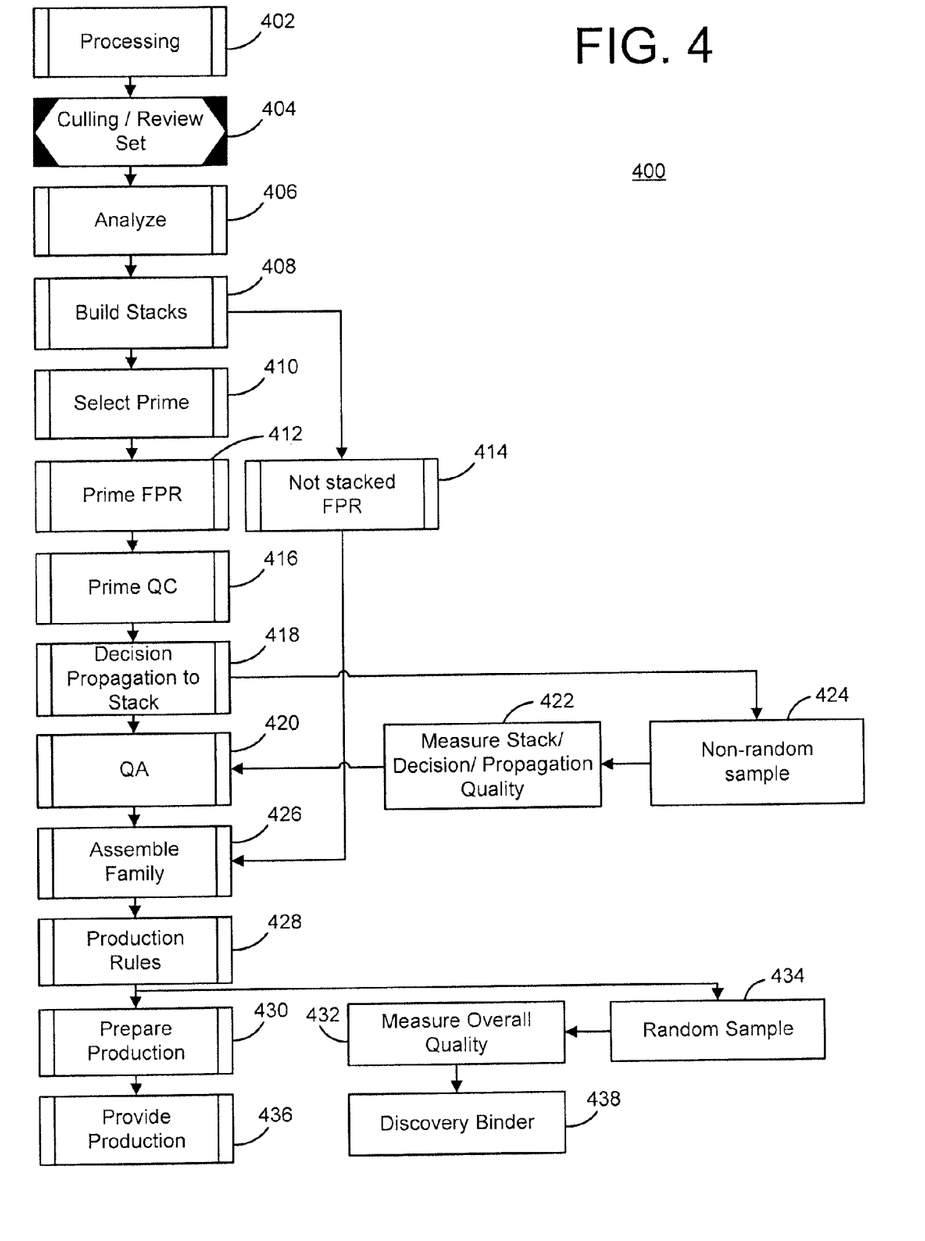
FIG. 4 is a process flow diagram illustrating a method of confirming the accuracy of computer decisions made for stack documents.

FIG. 4 illustrates a process flow diagram 400 in which documents for further review are obtained at 402 so that they can be culled or otherwise prepared for review at 404. These documents are analyzed at 406, and stacks are then built at 408. From these stacks, prime documents are selected at 410 so that a prime first pass review can be conducted by one or more human reviewers at 412. Quality control can be performed by one or more human reviewers on the prime documents at 416 and any related decisions made as part of the first pass review and the subsequent quality control can be propagated to the stack at 418. In some cases fully randomized, stratified (randomized within pre-defined parameters (such as weighting by tier representation)) or non-randomized samples (i.e., samples having pre-defined characteristics, attributes, etc.), can be selected at 424 so that stack/decision propagation quality can be measured at 422. Quality assurance/remediation can be performed on documents in stacks for which the decision has been propagated at 420. While FIG. 4 illustrates a particular stage at which QA is performed, it will be appreciated that depending on the desired configuration, QA can be initiated at different and/or multiple points, or in some cases, QA can be bypassed altogether. QA can include further statistical analysis on documents within a particular stack and/or human review of such documents within a particular stack. The documents selected for QA can be chosen based, for example, on the techniques described above.

Families of documents can be assembled by additionally combining any documents that were not stacked but which were subject to a first pass review at 426. Production rules (which may be rules specified as a result of the production requests) can be applied to help ensure that responsive documents are produced to the opposing party at 428. Based on these production rules production is prepared at 430, and later the responsive documents are provided to the requesting party at 436. Random samples can be obtained prior to production at 434 so that overall quality can be measured at 432, and a discovery binder can be prepared which details/characterizes the results in case the integrity of the characterization of documents or the characterization process is challenged at 438.

The system can be configured to incorporate additional documents as a case is expanded. The addition of these new documents may but does not necessarily add to the amount of human review that will be required. As additional documents are added to the case, the documents can be analyzed for similarity to the documents that have already been processed, allowing the new documents to be an incremental addition to the entire case matter. Many of the documents may be found to be similar and related to documents that have already been processed, and can be added to the stacks that contain those similar documents. If the prime document of that stack has already been human reviewed, the decision made on it can automatically be applied (through propagation) to the newly added documents. Additional quality control process described herein/above can be performed according to the methods to affirm that the statistical quality of the stacks is still at an acceptable level. If the prime document has not yet been human reviewed, when its decision comes back, it can be propagated through to the entire stack—including the new incrementally added documents—as previously described.

Files (which can be the documents themselves or electronic representations of same) can be created by various methods and tools (computer software applications) and stored on various computer readable media and non-computer readable media (including paper). During the creation or storage process, relationships between files can be established. These relationships can be explicit. Examples of explicit relationships: For computer readable media an example is a file embedded as an "attachment" to transmittal electronic messaging and other types of embedded objects; for non computer readable media an example is physical binding, such as staple or clip. For both computer readable and non computer readable media, the relationship can be implicit, such as storage organization "metaphor". Examples of implicit relationships are folders (both physical and "logical") or file owner (custodian) (both individual or organizational). During the file preparation (file processing) stage, files can be catalogued individually including embedded objects (attachments). For the purpose of evaluation (review), documents can be gathered from the storage media into a set (collection). During set preparation, the file relationship and its position in the relationship (family, parent, attachment/child) are captured and maintained (i.e., a hierarchical relationship among all of the files can be established, etc.).

In support of predictive (propagated) computer decisions, the files can be submitted to various analytical engines individually (without regard to the file relationship). The files can be grouped (stacked) by an algorithm and file relationships can be disregarded (or not). This allows for an individualized ("four corner") file evaluation. Files can then be subjected to human evaluation (review) and file characteristics and categorization can captured. A computer decision algorithm can be used to predict (propagate) these decisions for the other files in the stack.

Eventually every file in a set has a decision based at least in part on its individual content. It is sometimes necessary to make a decision for a file based on its context in addition in its content. The decision for a file can be impacted by other documents to which it is related. To do this it can be necessary to rank (weight) decisions for such other documents to the file. For the purpose of assigning a decision the relationship between the files is considered as well as its position within the relationship. An algorithm (trumping) can combine the decision rank and the file relationship, its position in the relationship and other information to determine and assign a single decision to every file in the relationship.

The following empirically illustrates the advantages of the current subject matter in relation to conventional techniques for creating defensible document stacks. The following is based on documents from three lawsuits of major companies operating in different industries. The first case (Case 1) involved a governmental investigation of a financial institution arising out of a sale of securities, the second case (Case 2) involved a dispute concerning a government contract, and the third case (Case 3) involved an intellectual property dispute between a pharmaceutical company and a consumer services company.

For the three cases, 838,674 documents were submitted into a similarity engine using text comparison algorithms. Documents that contained no text were culled and case de-duplication (a pre-screen removal of duplicates) had been performed prior to the submission of the documents into the similarity engine. Of the 838,674 documents, a total of 611,384 were placed in multi-member stacks and 227,290 were removed as "Unique" or "Exception" documents that failed to stack. This resulted in 119,706 stacks with 485,190 "non-Prime" stacked documents. The number of documents per case is broken down in Table 1 below.

TABLE 1

|  | DOCUMENTS TO ENGINE | UNIQUE DOCUMENTS | PRIME DOCUMENTS | OTHER STACK DOCUMENTS |
| --- | --- | --- | --- | --- |
| CASE 1 | 398,450 | 77,928 | 45,344 | 250,360 |
| CASE 2 | 355,922 | 127,424 | 44,057 | 184,441 |
| CASE 3 | 84,302 | 21,938 | 30,305 | 50,389 |

From the 611,384 documents that stacked, a randomized sample was taken of 59,428 documents, which was composed of 16,282 prime documents and 43,146 other stack members. This sample size was chosen to provide a large enough sample to generate a high degree of confidence that the measured accuracy rate would apply across the total population of documents, both on an aggregate basis and a case-by-case basis, as explained in subsequent sections.

A group of human reviewers then checked the stacks to determine whether stack members' propagated categorizations were correct. Based on 100 percent review of stack members, each stack member's coding (e.g., categorization, etc.) was compared to the corresponding prime document's coding to assess the accuracy of the propagation with respect to each stack member. Reviewing the tier-based accuracy calculations, it was determined that stack performances were unacceptably declining at similarity scores of 40 and below. Therefore, those documents that would normally be referred for reprocessing and/or full human review were segregated.

As a result, 43,659 documents having similarity scores above 40 were submitted for accuracy analysis, and 15,769 documents having similarity scores at or below 40 were excluded from the test of machine processed documents. Thus, roughly 73 percent of the documents processed adequately to be quality tested in the study. The breakdown by case appears in Table 2 below:

TABLE 2

| TABLE 2 | SIMILARITY ABOVE 40 | SIMILARITY 40 AND BELOW |
| --- | --- | --- |
| CASE 1 | 14,275 | 3,421 |
| CASE 2 | 19,620 | 5,399 |
| CASE 3 | 9,764 | 6,949 |

Once those statistics were gathered, case-by-case and overall accuracy was calculated to measure the performance of the similarity engine sub-process and a confidence interval to verify the quality of those accuracy measurements (the statistical measure of likelihood that the results of the sampling could be accurately extrapolated to the entire population of documents).

Based upon rigorous testing by review teams on 43,659 randomly selected documents, it was determined that the automated propagation phase as described herein was 97.8 percent accurate in making an overall determination of whether documents were "Responsive" or "Not Responsive" to specific discovery requests.

The aggregate result for the document testing on all three cases was as follows:

TABLE 3

| ALL 3 CASES | RESPONSIVE | NOT RESPONSIVE | OTHER |
| --- | --- | --- | --- |
| ACCURACY | 97.9% | 98.1% | 98.1% |
| PRECISION | 97.1% | 98.6% | 100.0% |
| RECALL | 97.9% | 98.1% | 98.2% |
| F-SCORE | 97.5% | 98.3% | 99.1% |

Documents in the "Other" column were those that contained some amount of foreign language and, pursuant to review rules, could not be coded definitively without further human review.

Accuracy results were also specified on a case by case basis as follows:

TABLE 4

| ACCURACY PER CASE | RESPONSIVE | NOT RESPONSIVE | OTHER | TOTAL |
| --- | --- | --- | --- | --- |
| CASE 1 | 98.1% | 99.1% | 92.3% | 98.9% |
| CASE 2 | 97.4% | 97.8% | 100.0% | 97.6% |
| CASE 3 | 98.8% | 96.5% | 100.0% | 97.6% |

Comparative studies also illustrate the advantages of the current subject matter as compared to traditional human review. In one study, the Text Retrieval Conference (TREC), sponsored by the National Institute for Standards and Technology, assessed human performance in review of more than 13,000 documents drawn from a population of 6.9 million documents actually produced in tobacco-related litigation.

According to the study, recent law graduates, third year students and other litigation specialists were directed to code documents according to agreed criteria, and they were allowed to appeal their findings to a more experienced senior reviewer called a "topic authority" who acted as a senior litigator would in the case. Reportedly, the topic authority re-categorized a document in roughly 80 percent of appeals, and the highest scoring team (as graded by senior reviewers) improved its recall by 47 percent due to these potentially time-consuming appeals.

In another study involving more than 490,000 documents, two ordinary human review teams were tested along with two commercially available electronic systems, and their results were compared to that of an original review by a very experienced authoritative reviewer. The results revealed that the human teams agreed with the authoritative original review only between 72 percent and 76 percent of the time on proper coding of documents.

Other studies have produced similar results, which is not surprising when one considers that human reviewers are prone to fatigue and distraction, and they are necessarily limited by their own subjective experiences in judging any one document.

Review based on perfect adherence to an algorithm, on the other hand, is inherently consistent if performed by the same system using the same formula, and machines do not suffer fatigue or distraction. Furthermore, electronic systems can perform calculations at far greater speeds and minimal cost.

In addition, a purely human review of large volumes of documents is always expensive. According to a study published in Digital Discovery & e-Evidence, a manual review of just 30 gigabytes of data can cost as much as $3.3 million. Using an assumed reviewer billing rate of just $50 per hour, a one terabyte case could cost more than $18.75 million to review.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, certain features such as quality control may occur at differing or multiple points within the overall process. Furthermore, certain features such as quality control can be omitted altogether. Other embodiments may be within the scope of the following claims.

What is claimed is:

1. A method comprising:
   receiving, by at least one data processor, data characterizing each of a plurality of documents within a document set;
   grouping, by the at least one data processor, the plurality of documents into a plurality of stacks using one or more grouping algorithms;
   identifying, by the at least one data processor, a prime document for each stack, the prime document including attributes representative of the entire stack;
   providing, by the at least one data processor, data characterizing documents for each stack including at least the identified prime document to at least one human reviewer;
   receiving, by the at least one data processor, user-generated input from the at least one human reviewer categorizing each provided document;
   sending, by the at least one data processor, data characterizing supplemental documents within a stack other than the provided documents to enable the at least one human reviewer to review a digital representation of such supplemental documents for quality control; and
   selecting, by the at least one data processor, randomized and stratified supplemental documents whose data is sent to the at least one human reviewer for quality control based on an algorithm designed to select documents based on their likelihood to require remediation, the selecting comprising:
   stratifying the supplemental documents by weighting the corresponding documents by tier representation; and
   randomizing the supplemental documents within predefined parameters comprising the weighting.

2. The method as in claim 1, further comprising: providing, by the at least one data processor, data characterizing the user-generated input.

3. The method as in claim 1, wherein categorization of each provided document by the user-generated input is propagated to all documents within the corresponding stack.

4. The method as in claim 1, wherein the at least one human reviewer categorizes each provided document in a group of document review categories.

5. The method as in claim 4, wherein the document review categories are selected from a group comprising: relevance, responsiveness, and privilege.

6. The method as in claim 1, further comprising: defining, by the at least one data processor, tiers of documents within each stack, and wherein the supplemental documents comprise documents from one or more tiers.

7. The method as in claim 6, wherein the tiers are based on one or more of: document similarity relative to the corresponding prime document, document type, document author, document sender, and document recipient.

8. The method as in claim 3, wherein documents are incrementally added to the document set after the grouping of the plurality of documents into the plurality of stacks, and wherein the method further comprises:
associating, by the at least one data processor, the incrementally added documents to one of the plurality of stacks; and
for each stack:
if the stack has already been categorized, adding, by the at least one data processor, the corresponding incrementally added documents to the stack and propagating the categorization to the incrementally added documents in such stack; or
if the stack has not been categorized, adding, by the at least one data processor, the incrementally added documents to the stack.

9. The method as in claim 3, wherein at least one document is incrementally added to the document set after the grouping of the plurality of documents into the plurality of stacks, and wherein the method further comprises:
determining, by the at least one data processor, that the at least one incrementally added document is not associated with a previously defined stack; and
defining, by the at least one data processor, a new stack including the at least one incrementally added document.

10. The method as in claim 3, further comprising:
defining, by the at least one data processor, hierarchical relationships among the plurality of documents within the set of documents; and
wherein the grouping algorithms take into account the relationships between documents when grouping the plurality of documents into the plurality of stacks.

11. The method as in claim 1, wherein the documents in the stacks are disjoint.

12. The method as in claim 2, wherein providing the data comprises one or more of: displaying the data, transmitting the data to a remote computing system, and persisting the data.

13. The method as in claim 1, wherein the data characterizing documents for each stack provided to the at least one human reviewer comprise reference numbers for the documents.

14. The method as in claim 1, wherein the data characterizing documents for each stack provided to the at least one human reviewer comprise digitally scanned versions of such documents.

15. An article of manufacture comprising:
computer executable instructions stored on non-transitory computer readable media, which, when executed by a computer, causes the computer to perform operations comprising:
receiving data characterizing each of a plurality of documents within a document set;
grouping the plurality of documents into a plurality of stacks using one or more grouping algorithms;
identifying a prime document for each stack, the prime document including attributes representative of the entire stack;
providing data characterizing documents for each stack including at least the identified prime document to at least one human reviewer;
receiving user-generated input from the at least one human reviewer categorizing each provided document;
sending data characterizing supplemental documents within a stack other than the provided documents to enable the at least one human reviewer to review a digital representation of such supplemental documents for quality control;
defining tiers of documents within each stack, and wherein the supplemental documents comprise documents from two or more tiers; and
selecting randomized and stratified supplemental documents whose data is sent to the at least one human reviewer for quality control based on an algorithm designed to select documents based on their likelihood to require remediation, the selecting comprising:
stratifying the supplemental documents by weighting the corresponding documents by tier representation; and
randomizing the supplemental documents within predefined parameters comprising the weighting.

16. The article as in claim 15, wherein categorization of each provided document by the user-generated input is propagated to all documents within the corresponding stack.

17. The article as in claim 15, wherein the human reviewer categorizes each provided document in a group of document review categories.

18. The article as in claim 17, wherein the document review categories are selected from a group comprising: relevance, responsiveness, and privilege.

19. The article as in claim 15, wherein the tiers are based on one or more of: document similarity relative to the corresponding prime document, document type, document author, document sender, document recipient.

20. A system comprising:
at least one data processor; and
memory storing instructions, which when executed by the at least one data processor, result in operations comprising:
receiving data characterizing each of a plurality of documents within a document set;
grouping the plurality of documents into a plurality of stacks using one or more grouping algorithms;
identifying a prime document for each stack, the prime document including attributes representative of the entire stack;
providing data characterizing documents for each stack including at least the identified prime document to at least one human reviewer;
receiving user-generated input from the human reviewer categorizing each provided document;

sending data characterizing supplemental documents within a stack other than the provided documents to enable the at least one human reviewer to review a digital representation of such supplemental documents for quality control; and selecting randomized and stratified supplemental documents whose data is sent to the at least one human reviewer for quality control based on an algorithm designed to select documents based on their likelihood to require remediation, the selecting comprising:

stratifying the supplemental documents by weighting the corresponding documents by tier representation; and randomizing the supplemental documents within pre-defined parameters comprising the weighting.

21. The method as in claim 1, wherein the data characterizing supplemental documents within the stack other than the provided documents are sent after receiving user-generated input from the human reviewer.

* * * * *